United States Patent [19]

Arai et al.

[11] Patent Number: 4,627,708

[45] Date of Patent: Dec. 9, 1986

[54] PHOTOCOPYING APPARATUS

[75] Inventors: Kouichi Arai; Yukio Akita, both of Tokyo, Japan

[73] Assignees: Casio Computer Co., Ltd.; Casio Electronics Manufacturing Co., Ltd., both of Tokyo, Japan

[21] Appl. No.: 631,057

[22] Filed: Jul. 16, 1984

[30] Foreign Application Priority Data

Jul. 18, 1983 [JP] Japan ............................ 58-130575

[51] Int. Cl.[4] ...................... G03G 15/04; G03B 27/34

[52] U.S. Cl. .................................... 355/14 R; 355/8; 355/57

[58] Field of Search .................. 355/3 R, 8, 14 R, 55, 355/57

[56] References Cited

U.S. PATENT DOCUMENTS

| | | | |
|---|---|---|---|
| 4,011,012 | 3/1977 | Kawai | 355/14 R X |
| 4,076,417 | 2/1978 | Hayashi et al. | 355/8 X |
| 4,080,062 | 3/1978 | Torigai et al. | 355/8 X |
| 4,420,246 | 12/1983 | Nonaka et al. | 355/8 X |
| 4,486,092 | 12/1984 | Ichinokawa | 355/8 |

*Primary Examiner*—Fred L. Braun
*Attorney, Agent, or Firm*—Sandler & Greenblum

[57] ABSTRACT

A photocopying apparatus is provided in which a moving area of a lens at the time of a magnification changing and that of an optical device such as a mirror unit overlap partly. At the time of the magnification changing, it is determined whether the optical device is positioned at a home position. When the optical device is not located at the home position, the lens is caused to move for the purpose of the magnification changing after the optical device is returned to the home position.

8 Claims, 5 Drawing Figures

PHOTOCOPYING APPARATUS

BACKGROUND OF THE INVENTION (1) The Field of the Invention

The present invention relates to a photocopying apparatus and particularly to a photocopying apparatus, which is capable of performing real size, reduction and enlargement photocopying by using a zoom lens.

(2) Description of Prior Art

As photocopying apparatus, there exists a magnification changing photocopying apparatus, which has the ability to perform enlargement and reduction reproduction as well as real size reproduction. A magnification ratio changing device which performs a reduction reproduction at the rate of 0.866 and 0.707 and also produces enlargement reproduction at the rate of 1.155 and 1.414 is already known. At present, a zoom lens is commonly used in an optical system.

FIG. 1 shows a a prior art photocopying apparatus and FIG. 2 is a diagram illustrating the relationship between the mirror moving area and the lens moving area in FIG. 1.

In FIG. 1, a contact glass 2 which is used as a plate (the original placing plate) on which the original is placed is located on the upper part of the photocopying apparatus body 1. A reflecting plate 4 is provided at the rear of an exposing lamp 3 which is composed of fluorescent light together with other components. The illumination of the original from the exposing lamp 3 occurs without loss. The reflected light from the original is incident on the first mirror 5.

The illumination device 6 is chiefly composed of the above-mentioned exposing lamp 3, reflecting plate 4, the first mirror 5. The illumination device 6, which performs the reciprocal scanning from one end to the other end of the original, which is placed on the contact glass 2, thereby illuminating the original by light from the exposing lamp.

The light reflected from the original is incident to the first mirror 5 in the illumination device 6. The light reflected by the first mirror 5 is further reflected by the second mirror 7 of the mirror unit 9 which is composed of the second mirror 7 and the third mirror 8, thereby entering into a zoom lens 10 through the third mirror 8.

The light passing through the zoom lens 10 is reflected by the fixed mirror 11 and is projected onto the photosensitive surface 12*a* of the photosensitive drum 12, thereby forming an electrostatic latent image of the original onto the photosensitive surface 12*a*.

The electrostatic latent image on a photosensitive surface 12*a* is developed by a developing device 13, thereby forming a visible image of toner. This toner image on the photosensitive surface 12*a* is transferred onto the copying paper 15 which is fed by the paper-feeding device 14 by an image-transferring device 16. The paper transporting device 17 then transmits the paper to a fixing device 18 to perform a heat fixing operation, and then the paper is ejected onto the tray 19.

On the other hand, the photosensitive surface 12*a* having passed through the image-transferring device 16 is subject to a discharging process by a discharge device 20. Then the toner remaining on the photosensitive surface 12*a* without being transferred to the copy paper is cleaned by a cleaning device 21. A device 22 establishes a uniform charge on the photosensitive surface 12*a* which waits for an exposure to be conducted by the fixed mirror 11. The copying operation is performed on the copying paper 15 by repeating these processes. The heat produced during the copying process is exhausted outside the apparatus by the blower 23 located within the apparatus.

When the copying cycle is performed the illumination device 6 is scanned at a constant speed towards the right direction and the exposure lamp 3 illuminates the original from one end thereof to the other. Then, simultaneously, the mirror unit 9 is moved towards the right direction at half the scanning speed, so that the length of the light path from the position of the illuminated original to the position of the zoom lens 10 is not varied.

When the magnification ratio is changed, the zoom lens 10 is moved from the reference position (shown by a solid line) to the position shown by a dotted line. For example, when an enlargement is conducted, the position of the zoom lens 10 is moved to position 10*a*. When a reduction is conducted, the position of the zoom lens is moved to the position 10*b*.

FIG. 2 shows a positional relationship between the mirror unit 9 and zoom lens 10 at the time of enlargement, real size and reduction reproduction. During real size reproduction, mirror unit 9 located at the start position of the scanning operation, namely, the home position, designated by a solid line, moves to the end position 9*a* of the scanning operation for a distance of $L_1$. Even if the mirror unit 9 is moved until the end 9*a* position of the scanning, the mirror unit 9 is separated from the zoom lens 10 by the distance $D_1$.

During enlargement, the zoom lens 10 is moved from the real size reproduction position towards the left by the distance $L_4$ from the position for the real size reproduction. In this instance, as the size of the maximum original which can be copied onto the copying paper of the predetermined size is smaller in comparison to the real size reproduction, the scanning distance of the illumination device 6 can be made shorter than the scanning distance at the time of the real size reproduction. Accordingly, the moving distance $L_2$ of the mirror unit 9 is also made shorter than the moving distance $L_1$ at the real size reproduction (as shown in FIG. 2).

When a reduction reproduction is performed, the zoom lens 10 is moved from the real size reproduction position towards the right direction by the distance $L_3$. In this case, the scanning distance of the mirror unit 9, which is moved at the time of copying the original is the same as that of real size reproduction, that is, $L_1$. As is clear from the above description, the position 10*a* of the zoom lens 10 at the time of enlargement reproduction is included in the scanning area (distance $L_1$) of the mirror unit 9 at the time of reduction reproduction. This means that, if the mirror unit 9 scans along the scanning distance $L_1$ as if real size or reduction reproduction had occurred, such that the zoom lens 10 is located at the position 10*a* for the enlargement reproduction, the mirror unit 9 would collide with the zoom lens 10. To prevent this problem, the scanning distance of the mirror unit 9 must be limited so that the mirror unit 9 does not invade the moving area of the zoom lens. To accomplish this countermeasure in prior art devices, the first limit switch 25, which limits the scanning distance of mirror unit 9 in case of real size or reduction reproduction, and the second limit switch 26, which limits the scanning distance of mirror unit 9 in case of enlargement reproduction, are individually disposed. (The second limit switch 26 is located before the first limit switch 25 in the scanning path of the illumination device 6 and both of them are actuated by the illumination device 6 which scans in connection with the mirror unit 9.)

However, even if the above-mentioned over-scanning countermeasure is employed, the mirror unit 9 may stop at a intermediate position between the first limit switch 25 and the second limit switch 26. In other words, the mirror unit 9 may pass through the position **9*b* and may stop in the vicinity of the position 9*a*** because of a paper jam or any other accident which occurs during the process of real size or reduction reproduction.

Under these circumstances, when the enlargement reproduction operation is performed, the zoom lens 10 is moved to the position **10*a* and collides with the mirror 9. Such a state is sometimes caused when the electric power is turned off during the copying cycle. In order to avoid such an unexpected situation, the distance between the mirror unit 9 and zoom lens 10 can be designed larger so that the mirror unit 9 does not collide with the zoom lens 10 when the zoom lens 10 reaches the position 10*a* for an enlargement reproduction. However, if the distance is extended, the focal length f of the zoom lens 10 is also extended. While the equation $F=f/D$ is established where the diameter of the lens is D, the brightness of the lens is F. As is clear from this equation, when the focal length is extended with regard to the same diameter of the lens, the brightness of the lens is lowered. It is therefore necessary to increase the quantitity of light from the exposing lamp 3 or to increase the diameter of the zoom lens 10 for the purpose of obtaining the same quantity of light on the photosensitive surface 12*a*. However, when the quantity of the light from the exposing lamp 3 is increased, the temperature adjacent to the exposing lamp 3 is increased and when the diameter of the zoom lens 10** is increased, the cost goes up, which means that the apparatus as a whole is not assembled in a compact manner.

SUMMARY OF THE INVENTION

Considering the defect of the above prior art, the present invention is aimed at providing a photocopying apparatus in which the mirror unit in the copying machine is moved completely adjacent to the zoom lens at the time of the real size reproduction as shown in FIG. 2 and, irrespective of where the mirror unit is located, the zoom lens does not collide with the mirror unit when it is moved for changing the magnification ratio of the copying.

According to one feature of the present invention, a photocopying apparatus comprises an optical device which can be moved in a reciprocal manner, having an original to be exposed and scanned, means for enabling the optical device to perform the reciprocal movement, a lens for projecting an image of the original from the optical device onto a photosensitive member, means for designating a magnification ratio of a photocopying means for moving said lens in accordance with said designating means, and a control means for determining whether said optical device is positioned at a predetermined area outside the area where said lens moves, and for operating said moving means for the lens after the optical device is moved into said predetermined area.

DETAILED DESCRIPTION OF THE INVENTION

Figure 1:
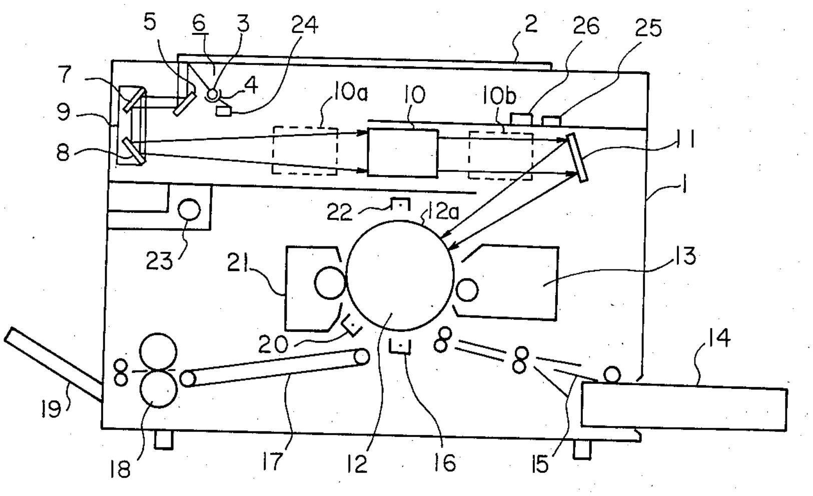
Fig. 1 (PRIOR ART)
FIG. 1 is a constructional drawing of the prior art photocopying apparatus.

The present invention will be described by referring to the embodiment shown in the drawings.

Figure 3:
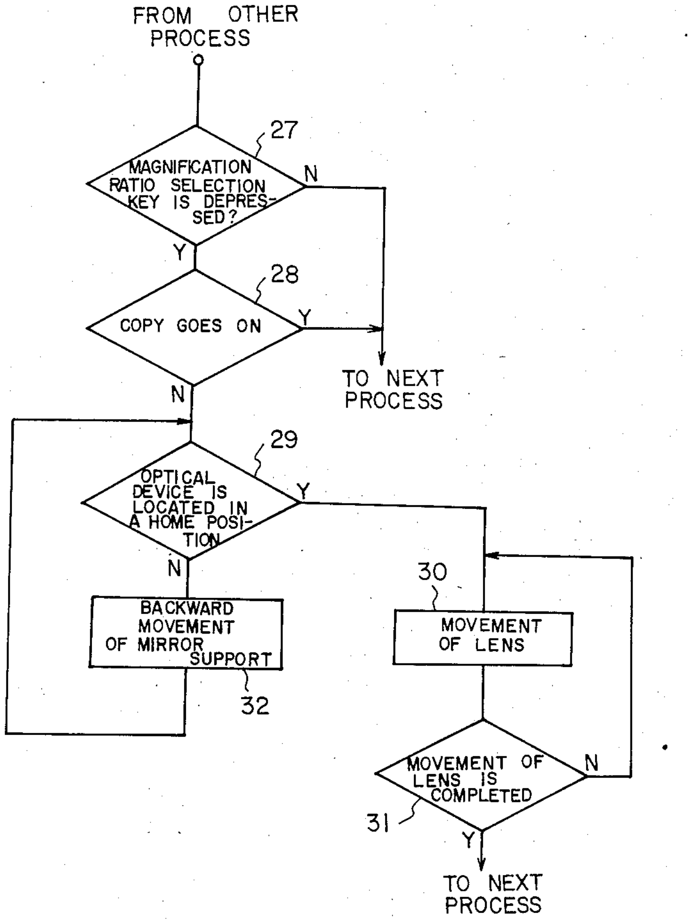
FIG. 3 is a flow chart of one embodiment of the present invention.

FIG. 3 shows one example of the flow chart of the program when the magnification ratio selection key is depressed. In order to explain the present invention, the copying apparatus shown in FIG. 1 will be referred to whenever necessary.

After the main switch (not shown) on the copying apparatus is turned on and the magnification selection key is depressed during the copying process, it is determined whether or not the magnification ratio selection key is depressed. If it is not selected (namely, "NO"), it advances to the next stage of the copying process. If it is detected by judgement 27 that the magnification ratio selection key is depressed (namely, "YES"), it is judged by judgement 28 whether the copying operation if now going on. In case of the copying process (namely, "YES") regardless of the fact that the magnification ratio selection key is depressed, the process advances to the next step. This is because the normal copied image cannot be obtained if the magnification ratio is changed during the process of the photocopying operation.

If it is determined by judgement 28 that the process is not in the copy operation step, the process advances to the next step. It is judged by judgement 29 whether or not the mirror unit 9 is located at a home position. The judgement 29 is conducted by detecting whether or not the illumination device 6 turns the home position switch 24 (FIG. 5) to on. If it is judged by judgement 29 that the mirror unit 9 is located on the home position (namely, "YES"), the process of moving the zoom lens 10 is executed and it is determined by judgement 31 whether or not the zoom lens 10 has completed movement. If the movement of the zoom lens 10 is completed (namely, "YES"), the next process, e.g. the copy start operation, is executed while if the judgement 31 is "NO", the process 30 of moving the zoom lens 10 is repeated.

If it is determined by the judgement 29 that the mirror unit 9 is not in the home position (namely, "NO"), a process 32 of moving the mirror unit 9 to the home position using a driving motor and returning clutch and so on is executed and then, the judgement 29 is conducted. When the mirror unit 9 has completed the movement to the home position, the zoom lens 10 is moved to a predetermined position in the same manner as described above and the process proceeds to the next step, e.g. the copy start operation.

By using a microcomputer which operates as described above, the stop position of the mirror unit 9 is detected wherever it stops due to problems such as paper jam or a power cut off and a collision of the mirror unit 9 and zoom lens 10 can be prevented.

Figure 4:
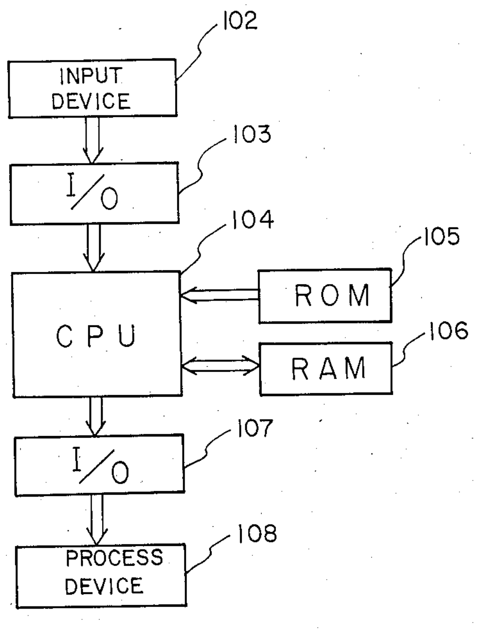
FIG. 4 is a block diagram of one embodiment of the present invention.

FIG. 4 is a block diagram of a control circuit in which the flow chart in FIG. 3 is executed by using a microcomputer. As for an input device 102, various switches are provided for detecting a particular state of the photocopying apparatus, such as the home position switch, a first and second limit switch, an enlargement position switch, and a real size position switch; and various switches operated by an operator, such as a real size key, enlargement key, reduction key and copying start key. These various switches will be described later in detail. The various signals inputted from the input device 102 are applied to a CPU 104 through an I/O controller 103. CPU 104 performs a data processing with ROM 105 and RAM 106 and delivers the output data through an I/O controller 107 to a processing device 108, thereby allowing a photocopying operation to be conducted. The processing device 108 consists of a lens motor, forward clutch, backward clutch, line motor and an exposing lamp.

Figure 5:
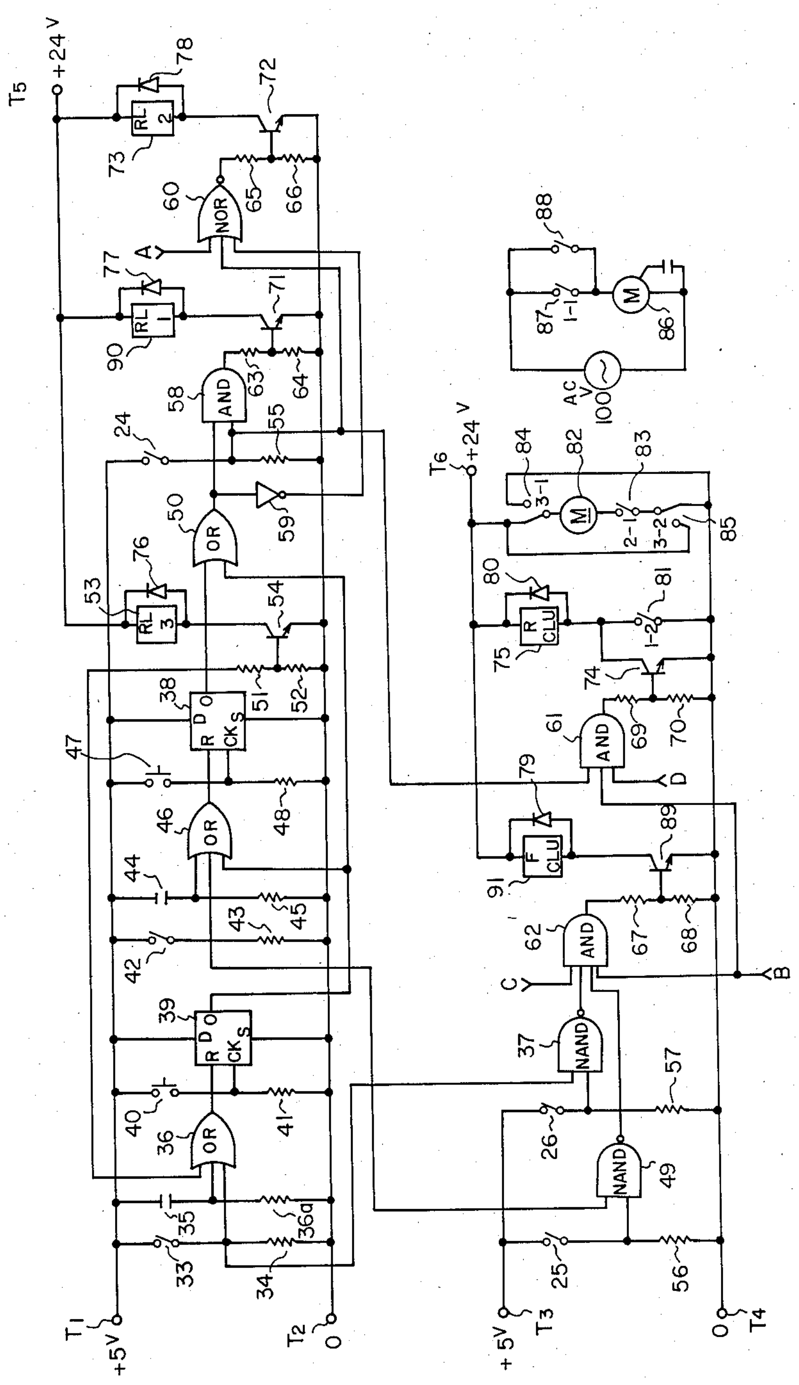
FIG. 5 is a circuit diagram of another embodiment of the present invention.

FIG. 5 shows a concrete form of the magnification changing control circuit of the present invention with a control circuit of the copying operation omitted. In FIG. 5, $T_1$ to $T_6$ are terminals of electric power supply and the voltages of $T_1=T_3=+5V$, $T_2=T_4=0V$, and $T_5=T_6=+24V$ are applied thereto. A serial circuit of an enlargement position switch 33 for detecting whether or not the zoom lens is positioned at an enlargement copying position and a resistor 34 and a serial circuit of a capacitor 35 and a resistor 36*a* are connected in parallel to each other. The output obtained from a node between the terminal of the enlargement position switch 33 and a resistor 34 is applied to an input terminal of an OR gate circuit 36 and a NAND gate circuit 37. The output derived from a node between a capacitor 35 and a resistor 36*a* is applied to one of the input terminals of the OR gate 36 and a signal from an output Q of the second D type flip-flop 38 is also added to one of the input terminals of an OR gate 36. The output of the OR gate 36 is supplied to a reset terminal R of the first D type flip-flop 39. Key 40 is an enlargement key for designating the enlargement copy. The output derived from the node between the key 40 and resistor 41 is applied to a CK terminal of the first D type flip-flop circuit 39. The D and S terminals of the first D type flip-flop circuit 39 are connected between the power terminals $T_1$ and $T_2$ and a series circuit of the enlargement key 40 and resistor 41 is likewise connected between the power terminals $T_1$ and $T_2$.

Element 42 is a real size position switch for detecting that the zoom lens is positioned at a real size position. A serial circuit of the switch 42 and a bias resistor 43, a series circuit of real size key 47 for designating the real size copying and a resistor 48, and D, S terminals of the second D type flip-flop 38 are connected in parallel between the respective power terminals $T_1$ and $T_2$. The output Q of the first D type flip-flop circuit 39, a node between the capacitor 44 and resistor 45 and a node between the real size position switch 42 and resistor 43 are connected to the input terminals of an OR gate circuit 46. The output derived from the node between the real size position switch 42 and the resistor 43 is also applied to one of the input terminals of the NAND gate circuit 49. The output of the OR gate circuit 46 is connected to the reset terminal R of the second D type flip-flop 38. A node between the real size key 47 and resistor 48 is connected to the clock terminal CK of the second D type flip-flop 38. The outputs Q of the first and second D type flip-flops 38, 39 are applied to an OR gate circuit 50 and the output Q of the second D type flip-flop 38 is connected to the power terminal $T_2$ through the bias resistors 51 and 52. The node between the resistor 51 and 52 is connected to the base of the transistor 54.

The following circuits are connected between the power terminals $T_1$ and $T_2$, and $T_3$ and $T_4$which are used for 5V: a series circuit of a home position switch 24 for detecting that the illumination, device is located at a home position, namely, the mirror unit 9 is located at a home position, and a resistor 55; a series circuit of the first limit switch 25 for detecting whether the illumination unit 6 has overrun at the time of real size copying and a resistor 56; and a series circuit of the second limit switch for detecting whether the illumination unit 6 has overrun at the time of the enlargement copying and a resistor 57. The output of the OR gate circuit 50 is applied to one of the inputs of the AND gate circuit 58 and the inverter circuit 59. The node between the home position switch 24 and resistor 55 is connected to the other input of the AND gate 58 and the input terminals of the NOR gate 60 and AND gate 61. The output of the inverter 59 and the signal at terminal A described hereinafter is applied to the input of the NOR gate 60.

The node between the first limit switch 25 and a resistor 56 is connected to the input terminal of the NAND gate 49. One terminal of the second limit switch 26 and resistor 57 is connected to the NAND gate 37. The outputs of the NAND gate circuits 37 and 49 are applied to the input of AND gate 62. The outputs from B and C, which will be described later, are applied to the AND gate circuit 62. Besides, the outputs from B and D which will be described later, are applied to the AND gate circuit 61.

The output of the AND gate circuit 58 is applied to the bias resistors 63 and 64 connected between the AND gate circuit 58 and the power terminal $T_2$. The voltage divided by the resistors 63 and 64 is applied to a base of the transistor 71 connected to a node between the resistors 63 and 64. Likewise, the output of the AND gate circuit 62 is supplied to the bias resistors 67 and 68 connected between the AND gate circuit 62 and the power terminal $T_4$, and a voltage divided by the resistors 67 and 68 is applied to a base of the transistor 89 connected to a node between the resistors 67 and 68. Likewise, the output of the AND gate circuit 61 is connected to the bias resistors 69 and 70 connected between the output of the AND gate circuit 61 and the power terminal $T_4$. A voltage divided by the resistors 69 and 70 is applied to a base of the transistor 74 connected to a node between the resistors 69 and 70. The output of NOR gate 60 is, likewise, applied to the bias resistors 65 and 66 connected between the output of the NOR gate 60 and the power terminal $T_2$. A voltage divided by the resistors 65 and 66 is applied to a base of the transistor 72 connected to a node between the resistors 65 and 66. The relays 53, 90 and 73 and the forward clutch 91 and the backward clutch 75 for the optical system are connected to the collectors of the transistors, 54, 71, 72, 89 and 74 respectively, a serial circuit of the transistors and the relays or clutches are connected in parallel between the 24V power terminals $T_5$ or $T_6$ and the earth terminals $T_2$ $T_4$. Elements 76 to 80 designate surge killer diodes.

The contact point 81 of the relay 90 ($RL_1$) forms a parallel connection with the transistor 74 and a lens motor 82 is connected between the power terminals $T_6$ and $T_4$ through a contact 83 of the relay 73 ($RL_2$), a contact 84 of the relay 53 ($RL_3$) and the other contact 85 of the relays 53 ($RL_3$), so that the lens motor 82 can be driven according to forward and reverse rotation.

Furthermore, the drive motor 86 driven by a commercial power source of 100V is connected in series with the contact 87 of the relay 90 ($RL_1$) and forms a parallel connection between the power sources, while the contact 88 of the relay (not shown in the drawing) which is operated by a print copy signal is connected parallel to a contact 87 of the relay. The relay contact 88 is closed during the copying operation and is opened after the copying operation is completed or when there is a paper jam.

The above-mentioned outpus A to D are respectively delivered from a control circuit (not shown in the drawing) in accordance with various signals such as a copying start signal, a signal for detecting the size of the copying paper, a signal for detecting the home position of the illumination apparatus, a signal for detecting a paper jam and a signal for resetting the jam, all of which are explained as follows:

A : the high level (which is referred to as "H") output during the copying operation or when there is a paper jam, and the low level (which is referred to as "L") output after the copying operation is completed or after the paper jam is reset.

B : "L" output when there is a paper jam and "H" output when there is no jam.

C : "H" output during the period of the forward operation of mirror unit 9; namely, the period from when the copy start key is on until after a predetermined time passes in accordance with the size of the copying paper, and "L" output during the other period.

D : "H" output only during the backward operation of the mirror units 9; namely, the period from when the forward operation of the mirror unit 9 is completed until the home position switch 24 is off, and the "L" output during the other period.

The operation of the photocopying apparatus circuit as constructed above will be described hereinunder.

When the mirror unit 9 is positioned at the home position and the zoom lens 10 is at the real size position, the home position switch 24 is open and the switch 42 for the real size position is closed. At this time, the enlargement position switch 33, enlargement key 40, real size key 47 and the first and second limit switches 25 and 26 are all in the open state and when the predetermined voltage is applied to the power terminals $T_1$ to $T_6$ by causing the power to be turned on, a current flows through the capacitor 35 and resistor 36*a* during the period when the electric charge is charged in the capacitor 35 and the reset signal is then applied to the first D type flip-flop circuit 39, thereby causing the output of the first D type flip-flop 39 to become "L".

Likewise, the current flows in a circuit comprising a capacitor 44 and a resistor 45 during the period when an electric charge is in a process of being stored in the capacitor 44 and the reset signal is aplied to the second D type flip-flop 38, thereby causing the output of the second D type flip-flop 38 to be in "L".

Next, by depressing the start key (not shown in the drawing) the relay contact 88 is closed and the electric current flows through the drive motor 86 from an AC 100V power source, thereby enabling the drive motor 86 to start rotating.

When "H" signal is applied to a point C based on the depression of the copy start key, the "H" signal is derived from AND gate 62 as the signals are applied to the NAND gates 37 and 49 and the point B are all "H". The voltage divided by the resistors 67 and 68 is applied to the transistor 89, thereby causing the forward clutch 91 to operate and allowing the mirror unit 9 to be moved in a forward direction (in the right direction in FIG. 1). The movement of the mirror unit 9 causes the home position switch 24 to close and the "H" signal is then applied to the AND gate 61. The original placed on the contact glass 2 is scanned in accordance with the forward movement of the mirror 9; the signal applied to point C at the termination of the scanning period is turned to "L" thereby causing the clutch 91 to be turned off. In contrast, the signal at the point D becomes "H" and the signal at the point, B is also "H" during the period other than when there is a jam. Therefore, the output of the AND gate circuit 61 is "H" and the voltage divided by the resistors 69 and 70 is applied to the base of the transistor 74, thereby allowing the transistor 74 and the backward clutch 75 of the mirror unit 9 to be turned on, with result that the mirror unit 9 is switched from the forward operation to the backward operation. When the home position switch 24 is again turned off by the backward opeation of the mirror unit 9, the transistor 74 is turned off and the backward clutch 75 is turned off. When the home position switch 24 is turned off, the signal at point D is also turned to "L".

Figure 2:
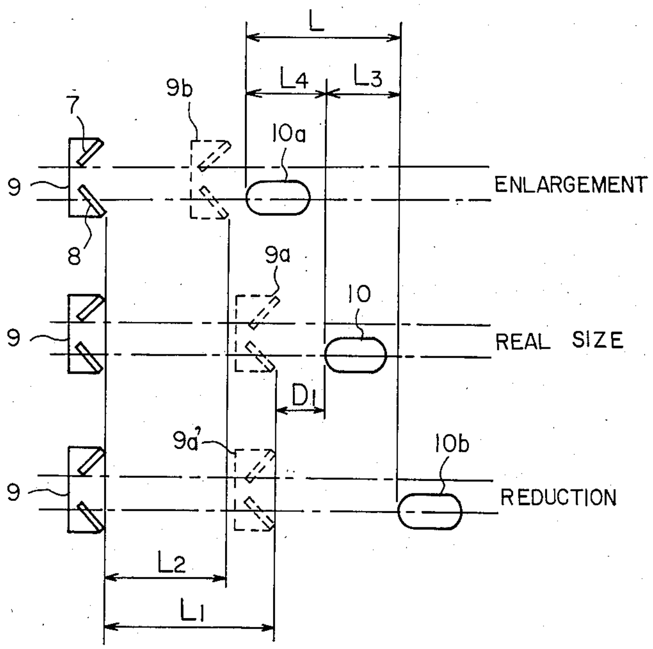
FIG. 2 is a diagram illustrating a relationship between a mirror unit moving area and a lens moving area.

When a jam is caused in the copy paper during the forward movement of the mirror unit 9 as described above, the mirror unit 9 covers the maximum stroke movement (FIG. 2, $L_1$), thereby causing the first limit switch 25 to close.

Thus, the "H" signal is applied to one input of the NAND gate circuit 49. At this time, if the real size position switch 42 has been turned on, "L" is outputted from the output of the above-mentioned NAND gate 49 and even if "H" is supplied to one of the inputs of the AND gate circuit 62 from the point B, the output of the AND gate circuit 62 is turned to "L", thereby causing the forward clutch 91 to be turned off, resulting in the stoppage of the mirror unit 9. Simultaneously, relay contact 88 is also turned off, thereby causing drive motor 86 to stop.

The case in which the enlargement copying operation is performed by depressing the enlargement key 40, after a jam state is corrected will now be explained. By depressing the enlargement key 40, +5V is applied to the clock terminal CK of the first D type flip-flop 39 as the clock input, thereby causing the output Q to become "H" and which results in the OR gate circuit 50 also becoming "H". At this time, the home position switch 24 is closed, thereby causing two inputs of the AND gate circuit 58 to become "H", and the output thereof to also become "H". Thus, a voltage divided by the resistors 63 and 64 is applied to the base of the transistor 71, thereby allowing it to be turned on which results in the relay 90 (RL-1) also being turned on. When the relay 90 is turned on, the contacts 81 and 87 of the relay are turned on, thereby allowing the drive motor 86 to start rotating and the backward clutch 75 to operate, with with the result that the mirror unit 9 starts moving backward.

Next, the backward movement of the mirror unit 9 allows the home position switch 24 to be depressed to the off position, thereby causing one input of the AND gate circuit 58 and the output thereof to become "L", with the result that the relay 90 is turned off. Therefore, the drive motor 86 and the backward clutch 75 are turned off, thereby allowing the mirror unit 9 to stop.

At this time, the signal at point A which is applied to the NOR gate 60 and the output from the inverter circuit 59 becomes "L", the turning off of the home position switch 24 allows the output of the NOR gate circuit 60 to become "H". The output of the NOR gate circuit 60 is divided in voltage by the resistors 65 and 66, thereby enabling the base of transistor 72 to be biased and turned on, with the result that the relay 73 (RL-2) is turned on. As the relay 53 (RL-3) is in the off state at this time, the contacts 84 and 85 of the relay 53 are turned to the normally closed position.

The on operation of relay 73 enables the contact 83 of the relay 73 to be turned on and the lens motor 82 for moving the zoom lens is driven, thereby causing the zoom lens 10 to move from the real size position to the enlargement position 10*a*. When the zoom lens 10 moves, the real size position switch 42 is opened and when it reaches the enlargement position, the enlargement position switch 33 is closed, thereby allowing the signal "H" to be applied to the input of the OR gate circuit 36 and enabling the output thereof to be "H". Thus, the reset terminal R of the first D type flip-flop circuit 39 receives a reset signal and "L" is delivered from the output Q of the first D type flip-flop circuit 39.

The output from the OR gate circuit 50, therefore, becomes "L" and is reversed by the inverter circuit 59, thereby applying "H" output to the input of the NOR gate circuit 60. Accordingly, the output of the NOR gate circuit 60 becomes "L", the relay 73 (RL-2) is deenergized and the contact 83 is also turned off, thereby causing the lens motor 82 to stop, with the result that the zoom lens has reached the enlargement position.

As is clear from the above description, according to the present invention of the image forming apparatus in which a moving area of a scanning optical device such as a mirror unit and a moving area of a zoom lens overlap, the collision of the scanning optical device and the zoom lens can be prevented by determining the order of the movement of the scanning optical device and zoom lens in a predetermined manner.

What is claimed is:

1. A photocopying apparatus comprising an optical device which can be moved in a reciprocal manner, for having an original exposed and scanned, means for enabling the optical device to perform a reciprocal movement, a lens for projecting an image of the original from the optical device onto a photosensitive member, lens position detecting means for detecting a position of the lens, means for designating a magnification ratio of a photocopying, means for moving said lens through an electric circuit in accordance with said designating means, and a position detecting switch for determining whether said optical device is positioned at a predetermined position outside the area where said lens moves, and operational means for operating said means for moving the lens after the optical device is moved into said predetermined position when said position detecting switch detects that said optical device is not positioned at said predetermined position and said lens position detecting means detects that the lens is not at a position for enlargement copying.

2. The photocopying apparatus according to claim 1, wherein said optical device comprises an exposing unit able to be moved reciprocally along the full length of the original and a mirror unit able to be moved one half the speed of the exposing unit in an interlocked manner with the exposing unit and a movement area of the mirror unit and that of the lens partly overlap.

3. The photocopying apparatus according to claim 1, wherein said lens is a zoom lens.

4. The photocopying apparatus according to claim 1, wherein said means for designating the magnification ratio of the photocopy includes a means for designating at least a real size photocopy and an enlargement photocopy.

5. The photocopying apparatus according to claim 1, wherein said lens moving means is operable only during a non-photocopying cycle.

6. The photocopying apparatus according to claim 1, wherein said predetermined position is a home position of the optical device.

7. A photocopying apparatus comprising:

(a) an optical device for producing an image of an original;

(b) means for moving said optical device from a home position toward an end position for scanning an original;

(c) a positionable lens for projecting an image produced by said optical device onto a photosensitive surface, the position of said lens determining the magnification ratio between the original and the image size on said photosensitive surface;

(d) means for detecting when said optical device is not at its home position;

(e) control means for operating said means for moving said optical device to move said optical device into said home position when said means for detecting determines that said optical device is not in its home position;

(f) means responsive to selection of a magnification ratio for positioning said lens in accordance with the selected ratio only if said optical device is located at its home position.

8. A photocopying apparatus according to claim 7 wherein said optical device comprises:

(a) an exposing unit movable at a predetermined speed along the entire length of said original;

(b) a mirror unit movable at one half of said predetermined speed along a predetermined movement area, said mirror unit being interlocked with said exposing unit;

wherein said movement area of said mirror unit and said movement area of said lens partly overlap.

* * * * *

UNITED STATES PATENT AND TRADEMARK OFFICE

CERTIFICATE OF CORRECTION

PATENT NO. : 4,627,708 Page 1 of 2

DATED : December 9, 1986

INVENTOR(S) : Kouichi ARAI et al.

It is certified that error appears in the above-identified patent and that said Letters Patent is hereby corrected as shown below:

In column 1, line 7, delete ",";

line 20, delete "a" (second occurence);

line 39, insert ---3--- after "lamp";

line 65, insert ---charging--- before "device"; (2nd occurrence)

In column 2, line 22, insert ---,--- after "size";

line 47, insert ---,--- after "original";

In column 3, line 58, insert ---,--- after "photocopying";

In column 4, line 27, change "if" to ---is---;

In column 6, line 6, delete "," after "illumination";

line 60, insert ---or--- after "$T_2$";

In column 7, line 33, change "units" to ---unit---;

line 56, change "aplied" to ---applied---;

In column 8, line 12, delete "," after "point";

line 21, change "opeation" to ---operation--

UNITED STATES PATENT AND TRADEMARK OFFICE

CERTIFICATE OF CORRECTION

PATENT NO. : 4,627,708

DATED : December 9, 1986

INVENTOR(S) : Kouichi ARAI et al.

It is certified that error appears in the above-identified patent and that said Letters Patent is hereby corrected as shown below:

line 42, delete "," after "40"; and lines 58, delete "with"

Signed and Sealed this

Fifteenth Day of December, 1987

*Attest:*

DONALD J. QUIGG

*Attesting Officer* *Commissioner of Patents and Trademarks*